United States Patent
Mizutani et al.

(10) Patent No.: US 8,801,114 B2
(45) Date of Patent: Aug. 12, 2014

(54) BRAKING FORCE DISTRIBUTION CONTROL DEVICE

(75) Inventors: Junji Mizutani, Obu (JP); Michio Akiyoshi, Gotenba (JP); Satoshi Udaka, Susono (JP)

(73) Assignees: Advics Co., Ltd., Aichi-pref. (JP); Toyota Jidosha Kabushiki Kaisha, Toyota-shi (JP)

( * ) Notice: Subject to any disclaimer, the term of this patent is extended or adjusted under 35 U.S.C. 154(b) by 1590 days.

(21) Appl. No.: 11/516,504

(22) Filed: Sep. 7, 2006

(65) Prior Publication Data

US 2007/0057574 A1 Mar. 15, 2007

(30) Foreign Application Priority Data

Sep. 14, 2005 (JP) ................................. 2005-266763

(51) Int. Cl.
*B60T 8/62* (2006.01)

(52) U.S. Cl.
USPC ........... 303/183; 303/184; 303/185; 303/154; 303/155

(58) Field of Classification Search
USPC .................. 303/183, 155, 153, 154, 184, 185
See application file for complete search history.

(56) References Cited

U.S. PATENT DOCUMENTS

| 5,012,417 | A | * | 4/1991 | Watanabe et al. | 701/71 |
| 5,481,455 | A | * | 1/1996 | Iwata et al. | 701/74 |
| 5,544,956 | A | * | 8/1996 | Mueller et al. | 303/196 |
| 5,583,773 | A | * | 12/1996 | Pfau | 701/78 |
| 5,668,724 | A | * | 9/1997 | Ehret et al. | 701/80 |
| 5,873,639 | A | * | 2/1999 | Takahashi et al. | 303/194 |
| 6,045,198 | A | * | 4/2000 | Naito et al. | 303/154 |
| 6,052,642 | A | * | 4/2000 | Wagner et al. | 701/70 |
| 6,334,657 | B1 | * | 1/2002 | Ohtsu | 303/177 |
| 6,385,523 | B1 | * | 5/2002 | Yokoyama et al. | 701/70 |
| 6,594,563 | B1 | * | 7/2003 | Ding | 701/34 |
| 7,069,133 | B2 | * | 6/2006 | Kobayashi et al. | 701/70 |

FOREIGN PATENT DOCUMENTS

JP    A-06-336157    12/1994

* cited by examiner

*Primary Examiner* — Robert A Siconolfi
*Assistant Examiner* — James Hsiao
(74) *Attorney, Agent, or Firm* — Posz Law Group, PLC

(57) ABSTRACT

A signal indicating an estimated body deceleration and a deceleration indicated by a detection signal from a G sensor are pass through first and second filters having different filter constants. Based on a resulting difference in response speeds thereof, it is determined whether sudden braking, i.e., quick depression, is being performed. If quick depression is determined, then even if an upper limit of a W/C pressure to rear wheels is set in order to prevent rear wheel locking precedent to front wheel locking, the W/C pressure is increased so as to exceed such an upper limit. Thus, a greater deceleration can be achieved than when the W/C pressure at the set upper limit is generated.

19 Claims, 9 Drawing Sheets

BRAKING FORCE DISTRIBUTION CONTROL DEVICE

CROSS REFERENCE TO RELATED APPLICATION

This application is based upon and claims the benefit of Japanese Patent Application No. 2005-266763 filed on Sep. 14, 2005, the content of which are incorporated herein by reference.

FIELD OF THE INVENTION

The present invention relates to a braking force distribution control device for performing a control for the distribution of a braking force to be generated to front and rear wheels (hereinafter referred to as a "braking force distribution control").

BACKGROUND OF THE INVENTION

A brake pedal may be depressed at an extremely high speed at times such as panic braking compared to the speed at which the brake pedal is operated during normal braking. In such cases, rear wheel locking precedent to front wheel locking can occur when the braking force distribution to the rear wheel side is increased while performing a front-rear braking force distribution control. Such rear wheel locking precedent to front wheel locking is undesirable because it destabilizes the vehicle condition.

Hence, Japanese Patent Application Publication No. JP-A-HEI6-336157 proposes starting a hydraulic control (pressure control) for the rear wheels earlier in the execution of the front-rear braking force distribution control so that rear wheel locking precedent to front wheel locking does not occur even at times such as panic braking.

However, starting the rear wheel hydraulic control earlier as mentioned above can also mean that the rear wheel hydraulic control starts before the rear wheel hydraulic pressure has been sufficiently increased. Consequently, it becomes impossible to ensure sufficient deceleration. In other words, it should be possible to obtain greater deceleration by increasing the hydraulic pressure to the rear wheels within a range that does not generate rear wheel locking precedent to front wheel locking. However, since the rear wheel hydraulic control is started regardless of the low hydraulic pressure, only deceleration corresponding to the low hydraulic pressure can be obtained. Although the rear wheel hydraulic pressure can be further increased especially in cases where the vehicle is loaded down with many occupants or much cargo, the maximum value of generable hydraulic pressure is determined too early, meaning that a large deceleration cannot be obtained.

SUMMARY OF THE INVENTION

It is an object of the present invention to perform a braking force distribution control, wherein a large deceleration can be obtained even if a rear wheel braking force, i.e., deceleration, for preventing rear wheel locking precedent to front wheel locking is quickly determined.

According to a first aspect of the present invention, a first portion inputs first and second signals respectively indicating two different speeds that change depending on an operation of a brake operation member during braking. A second portion maintains a braking force to a rear wheel when a signal with a faster response speed among the first and second signals reaches a first threshold. Furthermore, a third portion enables an increase in the braking force of the rear wheel over a period from a point at which a signal with a faster response speed among the first and second signals reaches the first threshold, up to a point at which a signal with a slower response speed among the first and second signals reaches a second threshold.

Thus, it is possible to determine sudden braking, i.e., quick depression of a brake pedal, based on the period from the point at which the signal with the faster response speed among the first and second signals reaches the first threshold, up to the point at which the signal with the slower response speed among the first and second signals reaches the second threshold. If quick depression is determined, then the braking force can be increased by increasing the wheel cylinder pressure so as to exceed an upper limit of the wheel cylinder pressure to the rear wheel, which may have been set to prevent rear wheel locking precedent to front wheel locking, for example. Therefore, a greater deceleration can be achieved.

According to a second aspect of the present invention, the first portion may input the first and second signals, which are formed by passing an identical signal through first and second filters having two different characteristics. In this case, as described in a third aspect of the present invention, the identical signal can be any one of a signal indicating an estimated body deceleration, a detection signal from an acceleration sensor, a detection signal from a master cylinder pressure sensor, and a detection signal from a stroke sensor for the brake operation member.

According to a fourth aspect of the present invention, the first portion may input the first and second signals, which are formed by either passing two different signals through a filter or through the first and second filters having two different characteristics. In this case, as described in a fifth aspect of the present invention, the two different signals may be a combination of any two of the signal indicating the estimated body deceleration, the detection signal from the acceleration sensor, the detection signal from the master cylinder pressure sensor, and the detection signal from the stroke sensor for the brake operation member.

According to a sixth aspect of the present invention, the third portion can increase the braking force to the rear wheel in accordance with a length of the period from the point at which the signal with a faster response speed among the first and second signals reaches the first threshold, up to the point at which the signal with a slower response speed reaches the second threshold.

Taking into account that the length of the period represents how quickly the brake pedal is depressed, it is possible to change how much the braking force to the rear wheel is increased based on the length of the period.

According to a seventh aspect of the present invention, the first signal is a signal indicating the estimated body deceleration and the second signal is the detection signal from the acceleration sensor. In addition, a fourth portion determines whether there is a steady difference between the estimated body deceleration indicated by the first signal and the deceleration indicated by the second signal. Furthermore, the third portion executes a backup control that increases the braking force to the rear wheel if the fourth portion determines there is the steady difference during the braking force distribution control.

Thus, if there is the steady difference between the estimated body deceleration indicated by the first signal and the deceleration indicated by the second signal, then the backup control to increase the braking force to the rear wheel is executed. Accordingly, it is possible to resolve the problem of an insufficient braking force to the rear wheel, which is caused by an offset included in the detection signal from the acceleration sensor.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
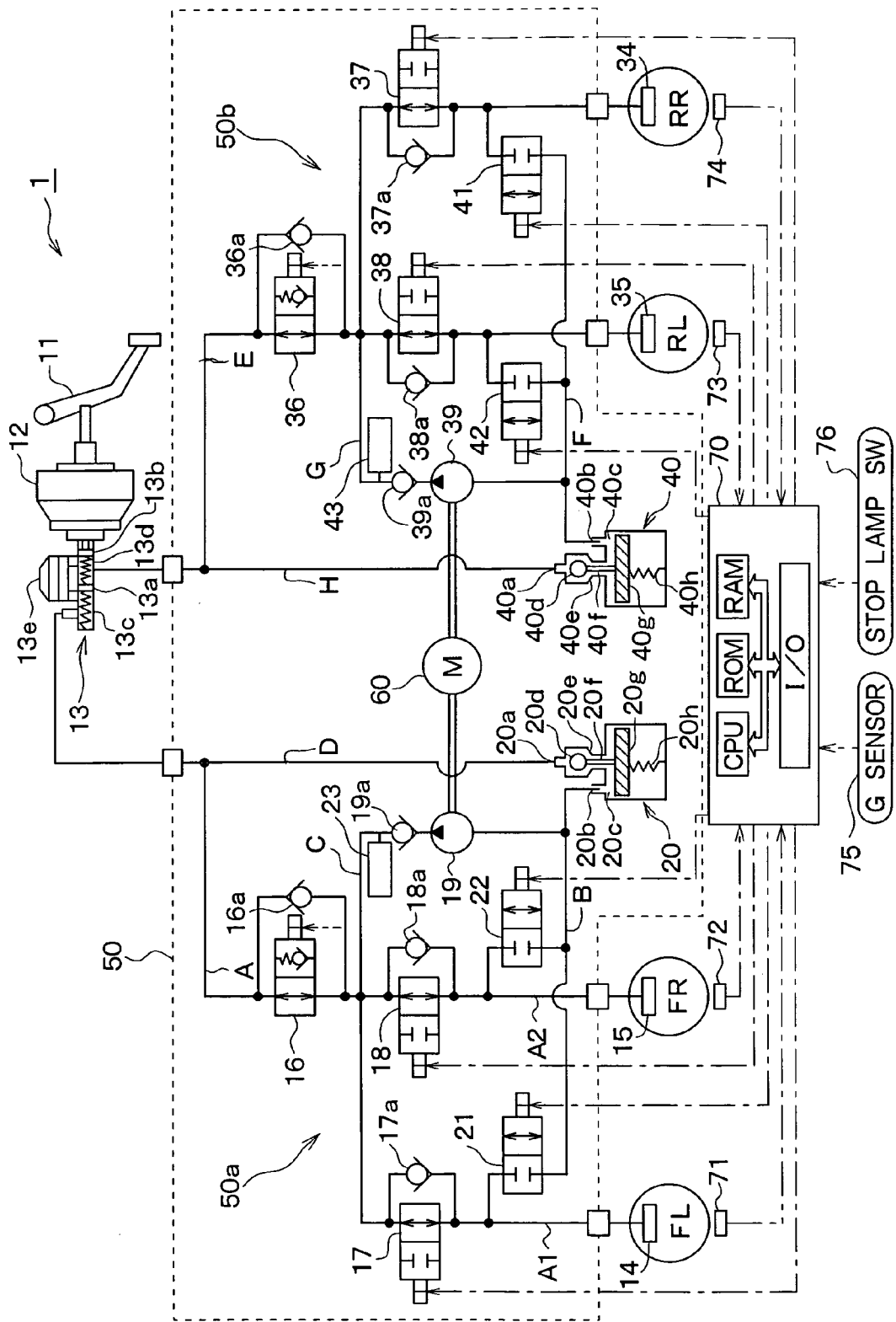
FIG. 1 is a drawing showing an overall structure of a braking force control device that realizes a braking force distribution control according to a first embodiment of the present invention.

The present invention will be described further with reference to various embodiments in the drawings.

First Embodiment

Hereinafter, a first embodiment of the present invention will be below. FIG. 1 shows an overall structure of a braking force control device 1 that realizes a braking force distribution control. The braking force control device 1 of the present embodiment is described below with reference to FIG. 1.

Referring to FIG. 1, the braking force control device 1 includes: a brake pedal 11; a brake booster 12, a master cylinder (hereinafter referred to as "M/C") 13; wheel cylinders (hereinafter referred to as "W/Cs") 14, 15, 34, 35; an actuator 50 for brake hydraulic pressure control; and a brake ECU 70.

The brake pedal 11 functions as a brake operation member that is depressed by a driver to apply a braking force to the vehicle. The brake pedal 11 is connected to the brake booster 12 and the M/C 13. The brake booster 12 and the M/C 13 correspond to a brake hydraulic pressure generation source. When the brake pedal 11 is depressed by the driver, the depression force is amplified by the brake booster 12, and pushes master pistons 13a, 13b that are disposed in the M/C 13. Accordingly, an identical M/C pressure is generated for a primary chamber 13c and a secondary chamber 13d defined by the master pistons 13a, 13b.

The M/C 13 includes a master reservoir 13e, which has passages in respective communication with the primary chamber 13c and the secondary chamber 13d. The master reservoir 13e delivers brake fluid to the M/C 13 via such passages, and accumulates excessive brake fluid inside the M/C 13. Note that the passages are formed with an extremely small diameter that is smaller than the diameters of the main conduits extending from the primary chamber 13c and the secondary chamber 13d. Therefore, an restriction effect can be exploited when brake fluid flows toward the master reservoir 13e from the primary chamber 13c and secondary chamber 13d side of the M/C 13.

An M/C pressure generated by the M/C 13 is transmitted to the W/Cs 14, 15, 34, 35 via the actuator 50 for brake hydraulic pressure control.

The actuator 50 for brake hydraulic pressure control is configured with a first brake system 50a and a second brake system 50b. The first brake system 50a controls brake hydraulic pressure applied to a front left wheel FL and a front right wheel FR. The second brake system 50b controls brake hydraulic pressure applied to a rear left wheel RL and a rear right wheel RR. A front-rear split brake system is configured by two brake conduits of the first and second brake systems 50a, 50b.

The configuration of the first and second brake systems 50a, 50b will be described hereinafter. Note that since the structure for each is substantially identical, the first brake system 50a is described below, whereas a description of the second brake system 50b is omitted by way of reference to the first brake system 50a.

The first brake system 50a includes a conduit A functioning as a main conduit for transmitting the M/C pressure mentioned above to the W/C 14 provided in the front left wheel FL and to the W/C 15 provided in the front right wheel FR. W/C pressure is respectively generated in the W/Cs 14, 15 via the main conduit A.

The conduit A includes a first differential pressure control valve 16 that is configured by an electromagnetic valve capable of being controlled to two positions, an open state and a differential pressure state. The first differential pressure control valve 16 is set to a valve position corresponding to the open state during normal braking, and is set to a valve position corresponding to the differential pressure state when electricity is supplied to a solenoid coil thereof. At the differential pressure valve position of the first differential pressure control valve 16, only the flow of brake fluid from the W/Cs 14, 15 side to the M/C 13 side is allowed at times when the brake hydraulic pressure on the W/Cs 14, 15 side increases a predetermined amount or more over the M/C pressure. Therefore, the W/Cs 14, 15 side is constantly maintained so as not to exceed a predetermined pressure over the M/C 13 side, whereby the respective passages are protected.

The conduit A branches into two conduits A1, A2 at farther downstream on the W/Cs 14, 15 side than the first differential pressure control valve 16. One of the two conduits A1, A2 has a first pressure increasing control valve 17 that controls an increase in the brake hydraulic pressure to the W/C 14, whereas the other has a second pressure increasing control valve 18 that controls an increase in the brake hydraulic pressure to the W/C 15.

The first and second pressure increasing control valves 17, 18 are configured by electromagnetic valves functioning as two-way valves that can be controlled to open and closed states. When the first and second pressure increasing control valves 17, 18 are controlled to the open state, brake hydraulic pressure due to the discharge of the M/C pressure or brake fluid from a pump 19 to be described later can be applied to the W/Cs 14, 15.

Note that during normal braking performed by the driver through operation of the brake pedal 11, the first differential pressure control valve 16 and the first and second pressure increasing control valves 17, 18 are constantly controlled to the open state.

In addition, the first differential pressure control valve 16, and the first and second pressure increasing control valves 17, 18 are respectively provided with check valves 16a, 17a, 18a in parallel. The check valve 16a of the first differential pressure control valve 16 is provided in order to enable the transmission of M/C pressure to the W/Cs 14, 15 in cases where the brake pedal 11 is depressed by the driver when the first differential pressure control valve 16 is set to the valve position corresponding to the differential pressure state. Furthermore, the check valves 17a, 18a of the first and second pressure increasing control valves 17, 18 are provided in order to enable a decrease in the W/C pressure of the front left wheel FL and the front right wheel FR in response to returning of the brake pedal 11 by the driver, especially during ABS control when the pressure increasing control valves 17, 18 are controlled to the closed state.

A conduit B functioning as a pressure decrease conduit connects a pressure-regulating reservoir 20 and portions of the conduit A between the first and second pressure increasing control valves 17, 18 and the W/Cs 14, 15. Respectively disposed on the conduit B are a first pressure decreasing control valve 21 and a second pressure decreasing control valve 22 which are formed from electromagnetic valves, and function as two-way valves capable of being controlled to open and closed states. The first and second pressure decreasing control valves 21, 22 are constantly controlled to the closed state during normal braking.

A conduit C functioning as a recirculation conduit is disposed so as to connect the pressure-regulating reservoir 20 and the conduit A acting as the main conduit. The conduit C is provided with a self-priming pump 19 that is driven by a motor 60 so as to intake brake fluid from the pressure-regulating reservoir 20 and discharge it toward the M/C 13 side or the W/Cs 14, 15 side.

Note that the discharge side of the pump 19 has a check valve 19a so that high-pressure brake fluid cannot be applied to the pump 19. Furthermore, a fixed capacity damper 23 is disposed on the discharge side of the pump 19 among the conduit C to moderate pulsations of brake fluid discharged from the pump 19.

A conduit D functioning as an auxiliary conduit is disposed so as to connect the pressure-regulating reservoir 20 and the M/C 13. Brake fluid is sucked from the M/C 13 by the pump 19 via the conduit D, and then discharged to the conduit A. In this manner, brake fluid is delivered to the W/Cs 14, 15 side during traction control (TCS control) and the like so as to increase the W/C pressure of applicable wheels.

The pressure-regulating reservoir 20 includes a reservoir hole 20a that is connected to the conduit D and receives brake fluid from the M/C 13 side; and a reservoir hole 20b that is connected to the conduit B and the conduit C, and also receives brake fluid flown from the W/Cs 14, 15 in addition to delivering brake fluid to the suction port side of the pump 19. The reservoir holes 20a, 20b are in communication with a reservoir chamber 20c. A ball valve 20d is disposed farther inward than the reservoir hole 20a. A rod 20f with a predetermined stroke in order to vertically move the ball valve 20d is separately provided on the ball valve 20d.

Provided within the reservoir chamber 20c are a piston 20g operatively associated with the rod 20f; and a spring 20h generating force that pushes the piston 20g toward the ball valve 20d side to push out brake fluid within the reservoir chamber 20c.

Once the pressure-regulating reservoir 20 configured as described above accumulates a predetermined amount of brake fluid, the ball valve 20d sits on a valve seat 20e such that brake fluid does not flow into the pressure-regulating reservoir 20. Accordingly, more brake fluid than can be sucked by the pump 19 does not flow into the reservoir chamber 20c, and high pressure is not applied to the suction port side of the pump 19.

Meanwhile, as mentioned above, the structure of the second brake system 50b is substantially identical to the first brake system 50a. That is, the first differential pressure control valve 16 and the check valve 16a corresponds to a second differential pressure control valve 36 and a check valve 36a. The first and second pressure increasing control valves 17, 18 and the check valves 17a, 18a respectively correspond to third and fourth pressure increasing control valves 37, 38 and check valves 17a, 18a. The first and second pressure decreasing control valves 21, 22 respectively correspond to third and fourth pressure decreasing control valves 41, 42. The pressure-regulating reservoir 20 and elements 20a-20h corresponds to a pressure-regulating reservoir 40 and elements 40a-40h. The pump 19 and the check valve 19a correspond to a pump 39 and a check valve 39a. The damper 23 corresponds to a damper 43. Also, the conduits A, B, C, D respectively correspond to conduits E, F, G, H.

However, the first differential pressure control valve 16 provided in the first brake system 50a and the second differential pressure control valve 36 provided in the second brake system 50b are set to achieve respectively different differential pressure values. Therefore, different brake hydraulic pressures can be generated by the first brake system 50a that generates braking force for the front wheels FL, FR and the second brake system 50b that generates braking force for the rear wheels RL, RR. Accordingly, suitable braking force distribution can be achieved for the front wheels FL, FR and the rear wheels RL, RR. This completes the description of the configuration of a hydraulic brake structure in the braking force control device 1.

The braking force control device 1 also includes wheel speed sensors 71 to 74. The wheel speed sensors 71 to 74 are located at the corresponding wheels FL, FR, RL, RR. The wheel speed sensors 71 to 74 output respective pulse signals with pulse numbers that are proportional to the respective rotation speeds of the wheels FL, FR, RL, RR, namely, the wheel speeds, to the brake ECU 70.

The braking force control device further includes an acceleration sensor (hereinafter referred to as a "G sensor") 75 and a stop lamp switch 76. The G sensor 75 outputs detection signals corresponding to acceleration in the longitudinal direction of the vehicle, generating a positive output during increases in acceleration and a negative output when deceleration occurs. The detection signal of the G sensor 75 is input to the brake ECU 70. The stop lamp switch 76 is turned ON during braking, and a condition of the stop lamp switch 76 can be used to determine whether braking is occurring.

The brake ECU 70 corresponds to a braking force distribution control device that performs a braking force distribution control, and is configured by a known micro-computer that includes a CPU, a ROM, a RAM, an I/O port and the like. Detection signals from the wheel speed sensors 71 to 74, the G sensor 75 and the like are received by the brake ECU 70. The respective detection signals are used in the execution of processing related to various brake controls, such as a braking force distribution control, ABS control, etc., in accordance with programs stored in the ROM and the like.

Based upon control signals from the brake ECU 70, voltage application control is performed for the control valves 16 to 18, 21, 22, 36 to 38, 41, 42 and the motor 60 in order to drive the pumps 19, 39 of the actuator 50 for brake hydraulic pressure control configured as described above. The W/C pressures generated for the W/Cs 14, 15, 34, 35 are thus controlled accordingly.

When the brake ECU 70 starts the braking force distribution control, for example, an upper limit is set for the W/C pressure generated for the rear wheels RL, RR. The brake ECU 70 thus output a control signal for driving the respective pressure increasing control valves 37, 38 corresponding to the rear wheels RL, RR so as to achieve the set W/C pressure. By suitably controlling the open and closed states of the pressure increasing control valves 37, 38, the W/C pressure to the rear wheels RL, RR is controlled. Accordingly, the W/C pressure to the rear wheels RL, RR is set to a value in accordance with a distribution determined by the braking force distribution control.

In this manner, the braking force distribution control is performed by the brake ECU 70 such that the braking force control device 1 realizes a braking force control based on the braking force distribution in accordance with the control signals from the brake ECU 70.

Furthermore, the brake ECU 70 performs a quick depression determination (determines whether the braking pedal 11 has been quickly depressed) as a part of processing for the braking force distribution control. Based on the result of this quick depression determination, gradual-increase output processing is performed so as to further increase the W/C pressure even if an upper limit has been set for the W/C pressure by the braking force distribution control.

Figure 2:
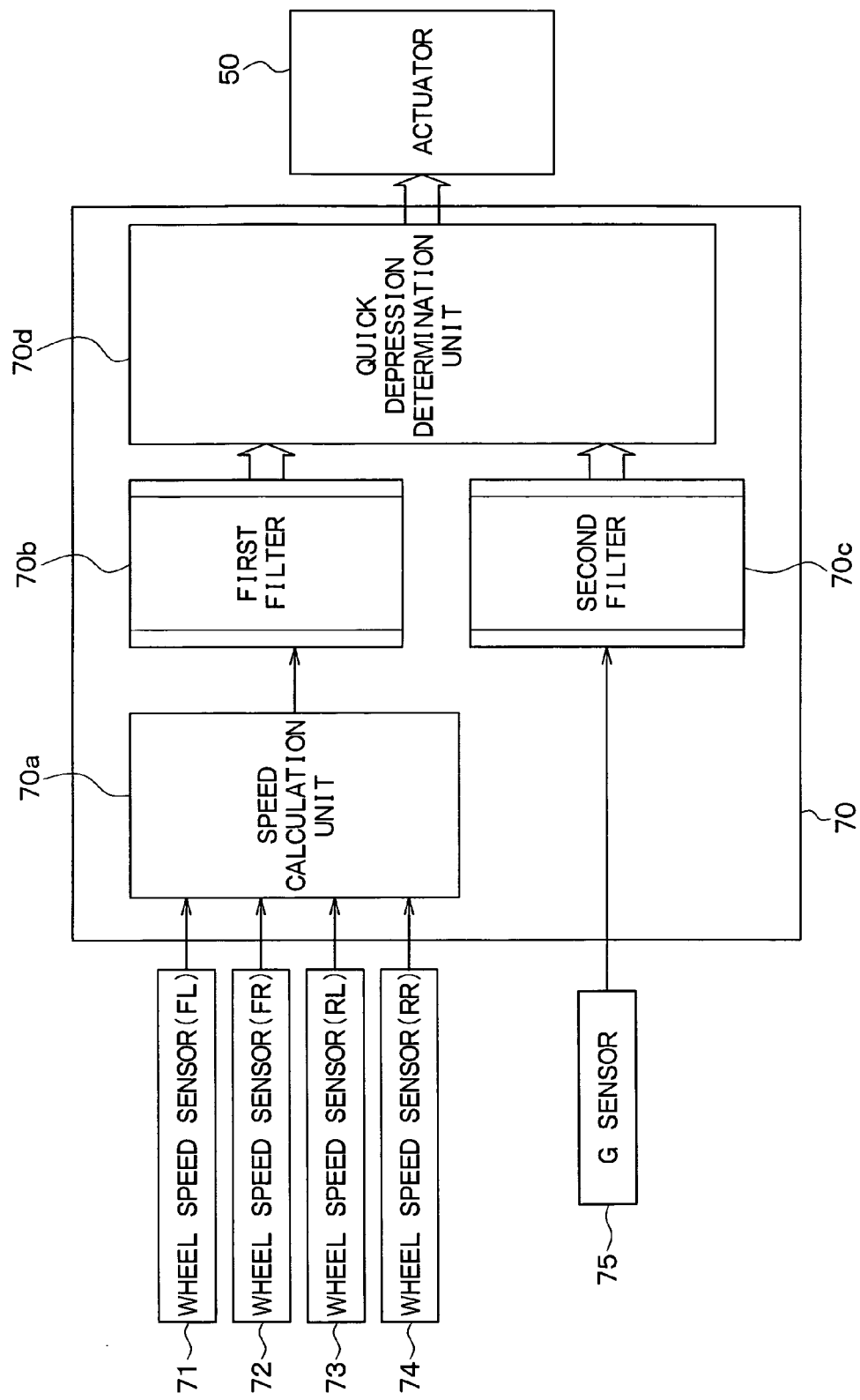
FIG. 2 is a block diagram showing only a function block that performs processing for a quick depression determination among a brake ECU.

FIG. 2 is a block diagram showing only a function block that performs the processing for the quick depression determination in the brake ECU 70.

Referring to FIG. 2, the brake ECU 70 includes: a speed calculation unit 70a, to which the detection signals from the wheel speed sensors 71 to 74 and the detection signal from the G sensor 75 are input and which performs calculations of an estimated body speed, a vehicle deceleration and the like; a first filter 70b that permits the transmission of a signal indicating the deceleration calculated by the speed calculation unit 70a; a second filter 70c that permits the transmission of the detection signal from the G sensor 75; and a quick depression determination unit 70d that performs a quick depression determination based on output from the first filter 70b and the second filter 70c.

Based on the detection signals of the wheel speed sensors 71 to 74, the speed calculation unit 70a calculates wheel speeds of the respective wheels FL to RR. The speed calculation unit 70a then performs the following calculations: an estimated body speed calculation using the calculated respective wheel speeds, a wheel deceleration calculation corresponding to a derivative of the wheel speed, and an estimated body deceleration calculation corresponding to a derivative of the estimated body speed. Note that various methods are commonly known that can achieve the estimated body speed calculation, and any such method may be used. Since the calculation method for the estimated body speed is common knowledge, a description of such is omitted here.

The first filter 70b and the second filter 70c extract and output signals of a desired frequency band from an input signal. The first filter 70b and the second filter 70c have different filter characteristics (filter constants) and thus generate output signals at different response speeds with respect to the input signal. The output signal of the second filter 70c corresponds to a second signal with a delayed response speed, and the output signal of the first filter 70b corresponds to a first signal with a fast response speed.

Thus during slow braking such as when the driver gradually depresses the brake pedal 11 (hereinafter referred to as "slow braking"), the signal input to the first filter 70b that indicates the body deceleration and the detection signal of the G sensor 75 input to the second filter 70c both gradually change. Accordingly, there is almost no difference in the response speeds of the output signals from the first filter 70b and the second filter 70c.

Alternatively, during sudden braking such as when the driver suddenly depresses the brake pedal 11, the signal input to the first filter 70b that indicates the body deceleration and the detection signal of the G sensor 75 input to the second filter 70c both rapidly change. Accordingly, the response speeds of the output signals from the first filter 70b and the second filter 70c generate difference.

The quick depression determination unit 70d corresponds to a first portion, and signals that have passed through the first filter 70b or passed through the second filter 70c are input thereto. Based on the difference in the response speeds of the output signals from the first filter 70b and the second filter 70c as described above, the quick depression determination unit 70d determines how fast the driver depresses the brake pedal 11. More specifically, as the difference in the response speeds increases, the quick depression determination unit 70d outputs command signals for driving the respective pressure increasing control valves 17, 18, 37, 38 so as to increase the W/C pressure to the rear wheels RL, RR. Such command signals may, for example, suitably control the open/closed states of the pressure increasing control valves 17, 18, 37, 38.

Next, a braking force distribution control realized by the braking force control device of the present embodiment with the above-described structure will be explained.

Figure 3:
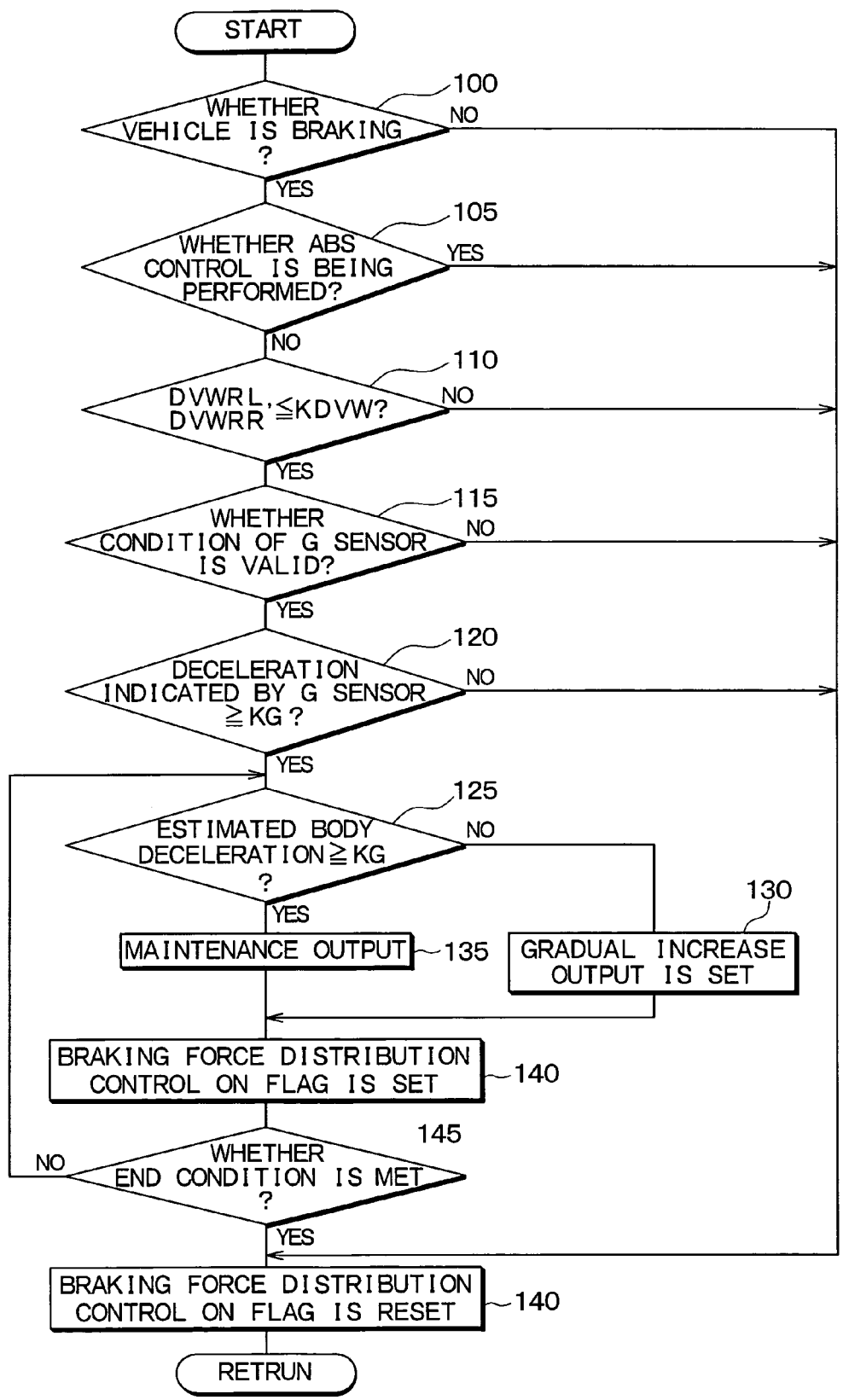
FIG. 3 is a flowchart of a braking force distribution control start determination that is performed by the brake ECU.

FIG. 3 shows a flowchart of a braking force distribution control start determination that is performed by the brake ECU 70. The processing shown in this figure may be performed at predetermined calculation cycles when an ignition switch (not shown) is switched from OFF to ON. Such processing is performed for the rear wheels RL, RR, and sets the upper limit of the W/C pressure to the rear wheels RL, RR. However, no W/C pressure upper limit is set for the front wheels FL, FR, since no such processing is performed therefore. It is thus possible to prevent the rear wheels RL, RR from locking before the front wheels FL, FR.

First at 100, it is determined whether the vehicle is braking. Such a braking determination can be made based on whether the stop lamp switch 76 is ON. Note that although the stop lamp switch 76 is used here, the braking determination can also be made depending on a detection signal from a depression force sensor or a stroke sensor that is provided on the brake pedal 11.

If a negative determination is made at 100, then the processing is ended as there is no need to perform the braking force distribution control. If a positive determination is made, then the routine proceeds to processing at 105, since the braking force distribution control may have to be performed.

At 105, it is determined whether ABS control is being performed. Such an ABS control determination can be made based on whether an ABS control flag is set. The ABS control flag is set when an ABS control start condition is met in an ABS control start determination that is performed separately in the brake ECU 70. The processing for the ABS control start determination is commonly known and therefore will not be described in detail here. However, it should be noted that the ABS control start condition involves whether a slip ratio, which represents a deviation between the estimated body speed calculated by the speed calculation unit 70a and the wheel speeds of the respective wheels FL to RR, exceeds a predetermined threshold. If the slip ratio exceeds the predetermined threshold, then the ABS control flag is set.

While the ABS control is being performed, the ABS control should be given priority over the execution of the braking force distribution control, in consideration of vehicle stability. Therefore, if a positive determination is made at 105, then the processing is ended without performing the braking force distribution control. If a negative determination is made, then the routine proceeds to processing at 110 since the braking force distribution control may have to be performed.

At 110, it is determined whether wheel decelerations DVWRL, DVWRR calculated by the speed calculation unit 70a are equal to or less than a predetermined deceleration threshold KDVW. If a certain degree of deceleration or more is achieved, then the wheel speed will reliably decrease to the estimated body speed. Therefore, providing the deceleration threshold KDVW enables execution of the braking force distribution control only when the wheel speed reliably decreases to the estimated body speed.

Accordingly, if a positive determination is made at 110, the routine proceeds to processing at 115; if a negative determination is made, then the processing is ended.

Subsequently at 115, it is determined whether the condition of the G sensor 75 is valid. The braking force distribution control cannot be accurately performed in cases where the deceleration indicated by the detection signal of the G sensor 75 is considerably offset from the actual deceleration. Therefore, the validity determination is made to prevent execution of the braking force distribution control in such cases. For example, the deceleration indicated by the detection signal of the G sensor 75 (i.e., the output signal of the second filter 70C) is compared with the estimated body deceleration calculated by the speed calculation unit 70a (i.e., the deceleration indicated by the output signal of the first filter 70b). If the difference between the two values is within a predetermined range, then the G sensor 75 is determined valid. But if the difference is outside the predetermined range, then the G sensor 75 is determined invalid.

If a negative determination is made at 115, then the processing is ended; if a positive determination is made, then the routine proceeds to processing at 120. Note that processing at 120 and thereafter corresponds to processing performed by the above-mentioned quick depression determination unit 70d in the brake ECU 70.

At 120, it is determined whether the deceleration indicated by the detection signal from the G sensor 75 is equal to or greater than a predetermined threshold KG. At this time, the deceleration indicated by the detection signal from the G sensor 75 uses a deceleration that has been pass through the first filter 70b, i.e., a deceleration indicated by the output signal of the first filter 70b.

When the deceleration is equal to or greater than the predetermined threshold KG, then an upper limit must be set such that the W/C pressure to the rear wheels RL, RR does not increase any higher, in order to prevent rear wheel locking precedent to front wheel locking. Therefore, if the deceleration is equal to or greater than the predetermined threshold KG, then the braking force distribution control is started, and the current W/C pressure generating a deceleration equivalent to the threshold KG is set as the upper limit. If the deceleration is not equal to or greater than the predetermined threshold KG, then the processing is ended as there is no risk of rear wheel locking precedent to front wheel locking.

Thereafter at 125, it is determined whether the estimated body deceleration is equal to or greater than KG. The estimated body deceleration here uses an estimated body deceleration after passing through the second filter 70c, i.e., an estimated body deceleration indicated by the output signal of the second filter 70c.

As explained above, the deceleration indicated by the detection signal from the G sensor 75 uses the deceleration indicated by the output signal of the first filter 70b at 120. However, at 125, the estimated body deceleration indicated by the output signal of the second filter 70c is used. The first filter 70b and the second filter 70c have different response speeds due to different filter constants.

Therefore, the estimated body deceleration indicated by the output signal of the second filter 70c reaches the threshold KG at a slower time period than the deceleration indicated by the output signal of the first filter 70b. More specifically, the difference in the response speeds of the output signal of the first filter 70b and the output signal of the second filter 70c is not particularly evident when the driver gradually depresses the brake pedal 11, but it is greatly evident when the brake pedal 11 is quickly depressed.

Thus in the case of quick depression of the brake pedal 11 (hereinafter referred to as "quick depression"), long time period is elapsed after the positive determination at 120 up to the positive determination at 125. Furthermore, the time elapsed corresponds to how quickly the brake pedal 11 is depressed; the longer the time elapsed, the faster the brake pedal 11 has been depressed. Therefore, at 120 and 125, it is possible to determine whether the brake pedal 11 has been quickly depressed, and also possible to determine how quickly the brake pedal 11 has been depressed.

If a negative determination is made at 125, then the routine proceeds to processing at 130, where a gradual-increase output is set. The gradual-increase output mentioned here means to gradually increase the W/C pressure in pulses by opening the pressure increasing control valves 37, 38 of the rear wheels RL, RR, or by using a duty control to set a period for which the pressure increasing control valves 37, 38 are open per a unit of time.

A W/C pressure upper limit was set at 120. However, in the case of a quick depression, rear wheel locking precedent to front wheel locking does not occur even if a W/C pressure greater than the upper limit is actually generated. Therefore, performing gradual-increase output in this case increases the W/C pressure such that it becomes equal to or greater than the upper limit, even if a W/C pressure upper limit has been set. It is thus possible to achieve considerable deceleration with a braking force that is greater than in cases where the W/C pressure at the set upper limit is generated.

The upper limit restricts the W/C pressure even in cases where rear wheel locking precedent to front wheel locking would not occur at a W/C pressure that is equal to or greater than the conventionally set upper limit. However, as described above, it is possible to prevent an inability to obtain sufficient deceleration that is caused by setting the upper limit of the W/C pressure for quick depression.

Figure 4:
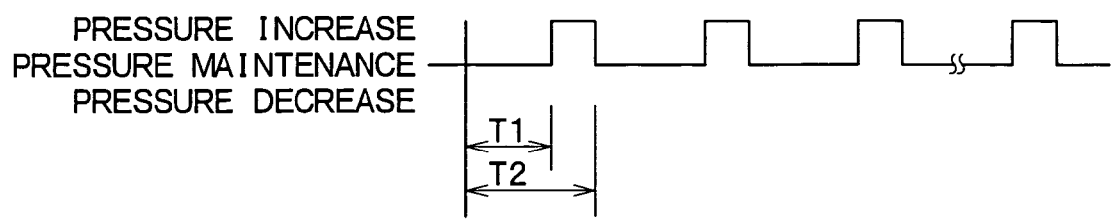
FIG. 4 is a timing chart showing an example of gradual-increase output.

FIG. 4 is a timing chart showing an example of gradual-increase output. A pattern for a maintenance period where the W/C pressure is maintained and an increase period where the W/C pressure is increased is set in advance. Current conduction is controlled to solenoid coils for driving the pressure increasing control valves 37, 38 in accordance with the pattern. In other words, during the maintenance period, current is flown to the solenoid coil to maintain the W/C pressure, and during the increase period current conduction to the solenoid coil is stopped so as to increase the W/C pressure.

In the case of a set gradual-increase output, an initial predetermined time T1 is designated as the maintenance period as shown in FIG. 4. If a state in which the gradual-increase output remains is continued for a duration exceeding the time T1, i.e., if the determination made at 125 continues to be negative, then a the maintenance period is switched to the increase period up to a predetermined time T2 so as to increase the W/C pressure in pulses. It is thus possible to achieve deceleration that is greater than in cases where the W/C pressure at the set upper limit described above is generated.

Note here that a maintenance period is set until the initial predetermined time T1 has elapsed. The reason for this is that if an increase period occurs immediately after the gradual-increase output is set, there is a risk that the W/C pressure may be increased even in cases where degree of quick depression is not high (rate of brake pedal 11 depression is not that fast). By not starting an increase period immediately after the gradual-increase output is set in this manner, the possibility of rear wheel locking precedent to front wheel locking can be prevented from increasing as a result of increasing the W/C pressure even in cases where degree of quick depression is not high.

In addition, the increase period is set here as the cycle for the predetermined time T2. However, the increase period may be set longer depending on the magnitude of the difference in response times. Also, the W/C pressure may be increased by multiple pulse amounts, instead of being increased by only one pulse amount.

In this manner, the gradual-increase output remains set until the estimated body deceleration becomes equal to or greater than the threshold KG. During this period, the open and closed states of the pressure increasing control valves 37, 38 are controlled so as to achieve a pattern of maintenance periods and increase periods such as shown in FIG. 4.

Once the estimated body deceleration is the threshold KG or greater, a positive determination is subsequently made at 125. The routine thus proceeds to processing at 135, where a maintenance output is set. Accordingly, current is continuously flown to the solenoid coils for driving the pressure increasing control valves 37, 38 to maintain the W/C pressure.

After performing the processing at 130, 135, the routine proceeds to processing at 140, where a braking force distribution control ON flag is set that indicates execution of the braking force distribution control. The routine then proceeds to processing at 145, where it is determined whether an end condition for the braking force distribution control is met.

Conceivable end conditions for the braking force distribution control, for example, include: turning the stop lamp switch 76 OFF; the occurrence of a system abnormality; the vehicle stopping such as when the estimated body speed reaches zero; and gradual releasing of the brake pedal 11 such that the deceleration falls, for example, to 0.1 G or less. As long as the preset end condition is not met, the routine returns to 125 and repeats to above respective processing. Once the end condition has been met, the routine proceeds to processing at 150, where the braking force distribution control ON flag is reset, and processing for the braking force distribution control start determination is ended.

Figure 5A:
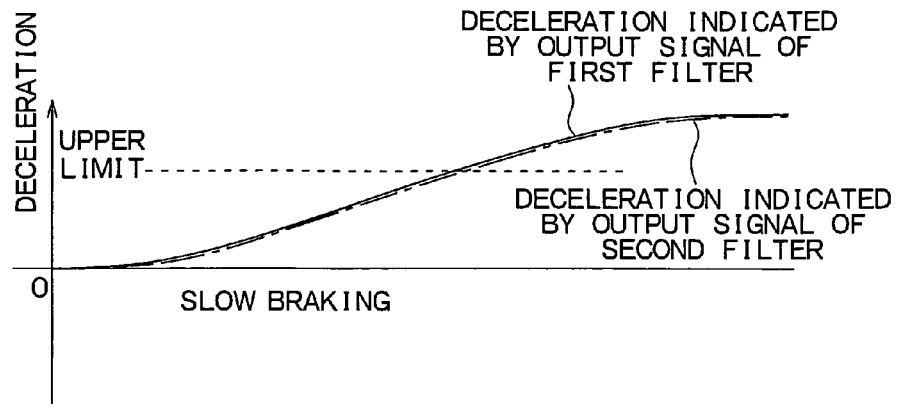
FIGS. 5A and 5B are timing charts of a deceleration indicated by an output signal of a first filter and an estimated body deceleration indicated by an output signal of a second filter during the respective cases of slow braking and sudden braking.
Figure 5B:
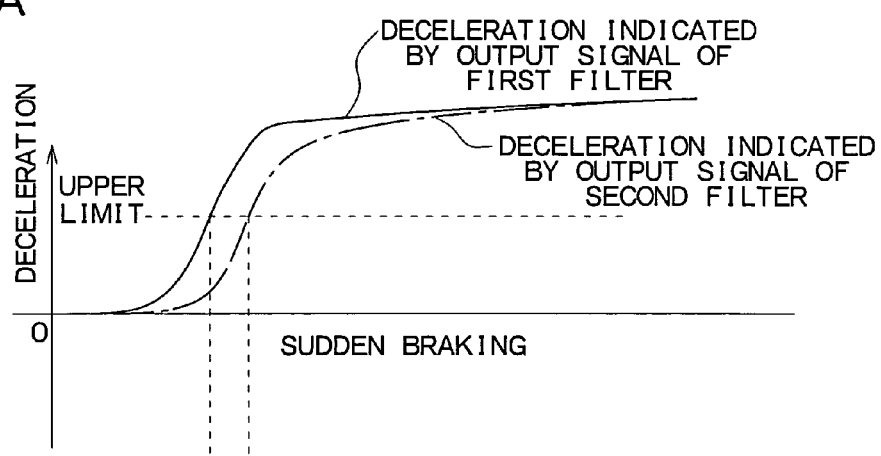
Figure 5C:
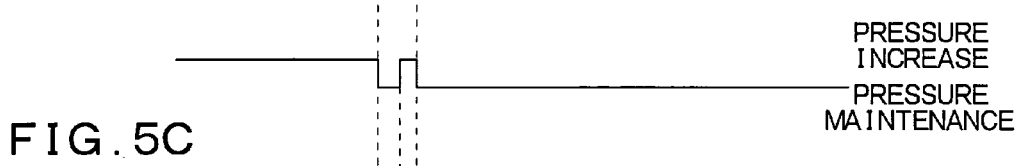
FIGS. 5C and 5D are timing charts for control conditions of pressure increasing control valves and a hydraulic pressure change in front and rear wheels FL to RR with respect to FIG. 5B.
Figure 5D:
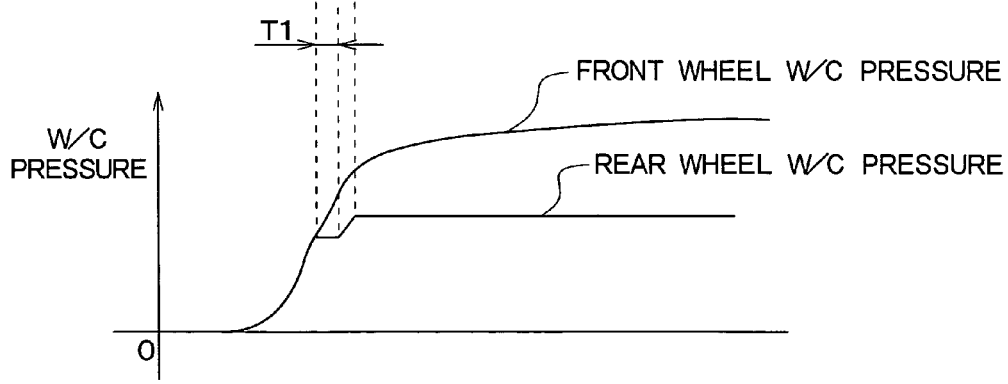

The specific operations involved in performing the above-described braking force distribution control determination processing will be explained with reference to FIG. 5. FIGS. 5A and 5B are timing charts of a deceleration indicated by the output signal of the first filter 70b and the estimated body deceleration indicated by the output signal of the second filter 70c during the respective cases of slow braking and sudden braking. FIGS. 5C and 5D are timing charts for control conditions of the pressure increasing control valves 37, 38 and a hydraulic pressure change in the front and rear wheels FL to RR with respect to FIG. 5B.

Referring to FIG. 5A, during slow braking when the driver gradually depresses the brake pedal 11, there is almost no apparent difference in the response speeds of the first filter 70b and the second filter 70c. Therefore, the deceleration indicated by the output signal of the first filter 70b and the estimated body deceleration indicated by the output signal of the second filter 70c are almost identical. In this case, the timing at which the positive determination is made at 120 and the timing at which the positive determination is made at 125 is almost simultaneous, and therefore a maintenance output at 135 is immediately set.

Meanwhile, referring to FIG. 5B, during sudden braking when the driver suddenly depresses the brake pedal 11, a large difference becomes apparent in the response speeds of the first filter 70b and the second filter 70c. There is thus a difference in the deceleration indicated by the output signal of the first filter 70b and the estimated body deceleration indicated by the output signal of the second filter 70c. In this case, the timing at which the positive determination is made at 125 is slower than the timing at which the positive determination is made at 120. Therefore, the gradual-increase output is set 130. After the predetermined time T1 has elapsed since the gradual-increase output was set as shown in FIG. 5C, the W/C pressure to the rear wheels RL, RR is increased in pulses and the W/C pressure is subsequently maintained.

For this reason, as FIG. 5D shows, even if the W/C pressure to the rear wheels RL, RR is limited with respect to the W/C pressure to the front wheels FL, FR at a set upper limit, it is still possible in this case to increase the W/C pressure so as to further exceed the upper limit in order to avoid rear wheel locking precedent to front wheel locking.

As described above, according to the present embodiment, it is determined whether sudden braking is being performed in which the driver has suddenly depressed the brake pedal 11, i.e., it is determined whether quick depression has occurred. An upper limit for the W/C pressure to the rear wheels RL, RR may have been set for preventing rear wheel locking precedent to front wheel locking. Even in such cases, however, it is still possible to increase the W/C pressure so as to exceed this upper limit in the case of quick depression. Thus, a greater deceleration can be achieved than when the W/C pressure at the set upper limit is generated.

Second Embodiment

A second embodiment of the present invention will be described below. The purpose of the present embodiment is to resolve problems that may arise when increasing the W/C pressure of the rear wheels RL, RR over the set upper limit as illustrated in the first embodiment. The basic structure of the braking force control device that performs the braking force distribution control, processing for the braking force distribution control start determination and the like are all identical, and thus only aspects different from the first embodiment will be explained.

Problems that may occur in the first embodiment will be described first. According to the first embodiment, as mentioned above, a large difference becomes apparent in the response speeds of the first filter 70b and the second filter 70c during sudden braking. Based on this difference, the W/C pressure to the rear wheels RL, RR is increased over the set upper limit when there is a difference between the deceleration indicated by the output signal of the first filter 70b and the estimated body deceleration indicated by the output signal of the second filter 70c.

This is valid when the detection signals from the G sensor 75 and the estimated body deceleration calculated by the speed calculation unit 70a indicate accurate decelerations. However, If the detection signal from the G sensor 75 has offset, then a difference occurs between the deceleration indicated by the output signal of the first filter 70b and the estimated body deceleration indicated by the output signal of the second filter 70c, even during times of non-sudden braking. The deceleration indicated by the output signal of the first filter 70b changes excessively faster than an accurate deceleration, and thus the upper limit of the W/C pressure to the rear wheels may be set excessively earlier than in a normal case.

Figure 6:
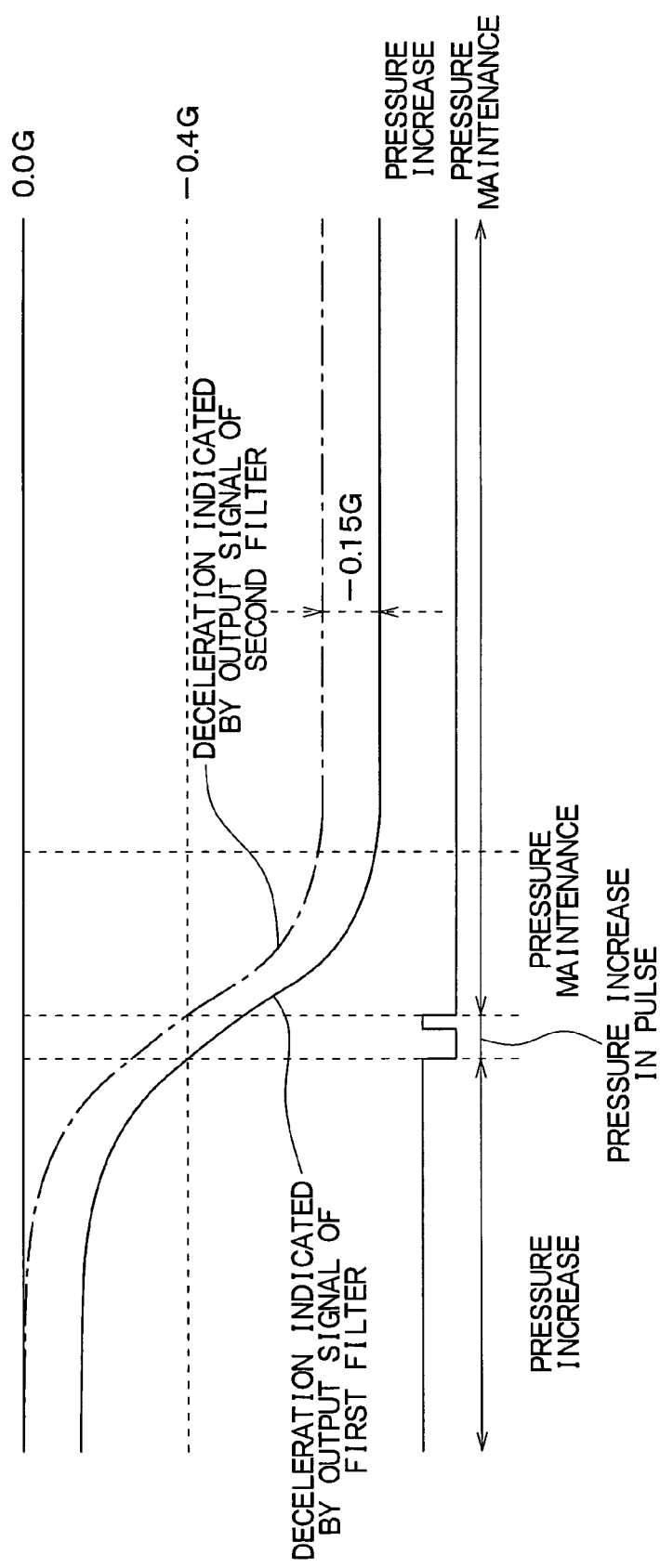
FIG. 6 is a timing chart during slow braking when a detection signal of an acceleration sensor is offset.

FIG. 6 shows a timing chart during slow braking when the detection signal of the G sensor 75 has offset. More specifically, the figure shows a timing chart for the deceleration indicated by the output signal of the first filter 70b and the estimated body deceleration indicated by the output signal of the second filter 70c, as well as the control conditions of the pressure increasing control valves 37, 38.

In the case of slow braking, as shown in FIG. 5A, there is almost no difference between the deceleration indicated by the output signal of the first filter 70b and the estimated body deceleration indicated by the output signal of the second filter 70c, provided that the detection signal of the G sensor 75 has no offset. However, as evident in FIG. 6, the detection signal of the G sensor 75 has offset, whereby a difference occurs between the deceleration indicated by the output signal of the first filter 70b and the estimated body deceleration indicated by the output signal of the second filter 70c; this is similar to generating a difference in the response speeds.

Thus, the deceleration indicated by the output signal of the first filter 70b changes excessively faster than the estimated body deceleration indicated by the output signal of the second filter 70c. This results in immediate setting of the upper limit of the W/C pressure to the rear wheels RL, RR. Consequently, even in cases of non-quick depression, there is an insufficient W/C pressure to the rear wheels RL, RR, and thus an insufficient braking force.

Figure 7:
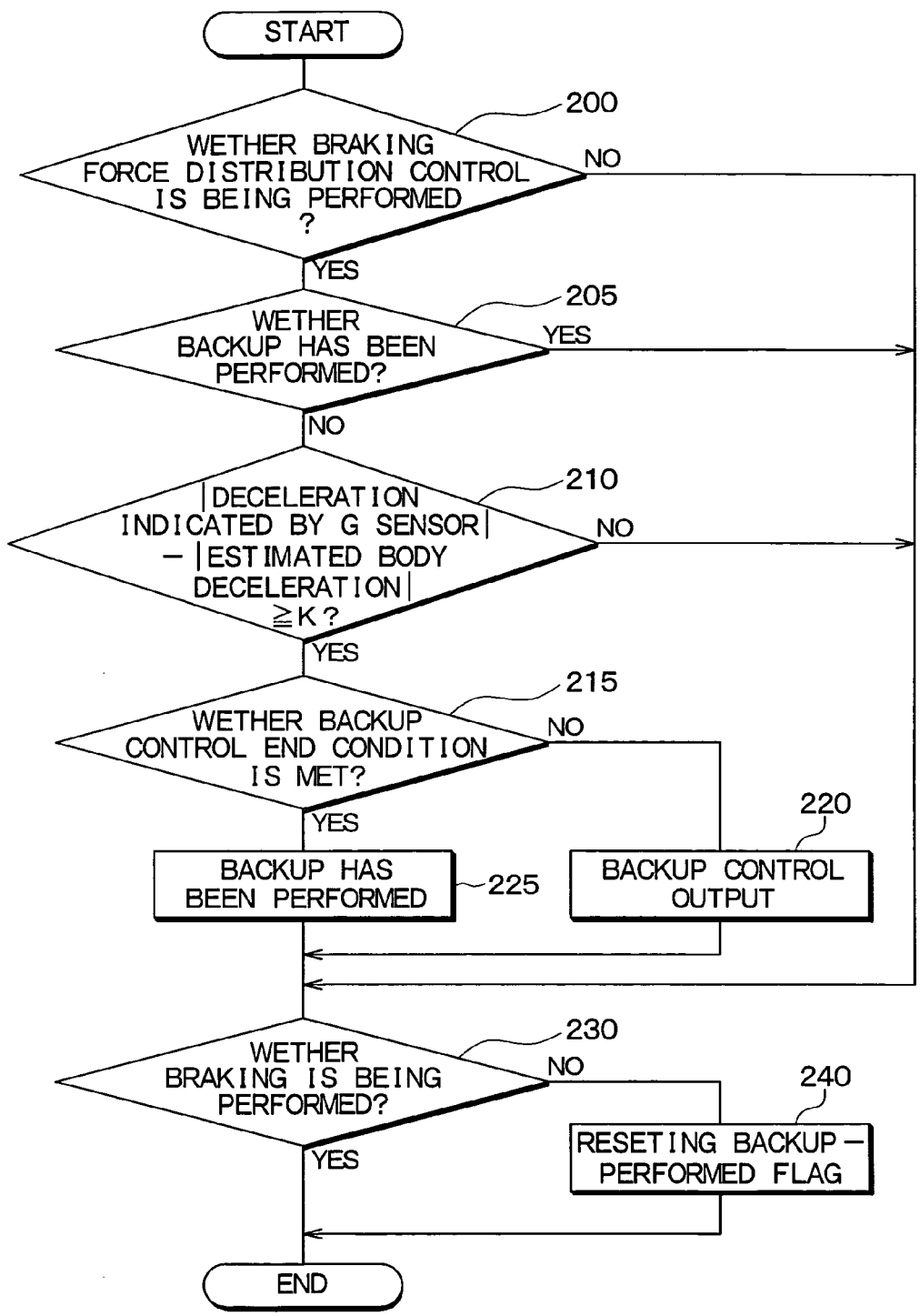
FIG. 7 is a flowchart of processing for a backup control determination for braking force distribution.

Hence, according to the present embodiment, the brake ECU 70 performs processing for a backup control determination for braking force distribution. FIG. 7 shows a flowchart of processing for a backup control determination for braking force distribution. The processing for the backup control determination for braking force distribution is performed at predetermined calculation cycles in parallel with the processing for the braking force distribution control start determination.

First at 200, it is determined whether the braking force distribution control is being performed. In this case, a positive determination is made if the braking force distribution control ON flag has been set at 140 in the processing for the braking force distribution start determination shown in FIG. 3; a negative determination is made if the flag has been reset at 150 in the same processing.

Once a positive determination is made at 200, the routine proceeds to processing at 205, where it is determined whether a backup of the W/C pressure has been performed (i.e., whether the W/C pressure has been supplemented). The term "backup" refers to increasing the W/C pressure as a backup measure, in order to compensate an insufficient W/C pressure to the rear wheels RL, RR that is caused by an offset included in the detection signal from the G sensor 75. Therefore, a negative determination is made if backing up has not been performed; otherwise a positive determination is made. Note that whether a backup has been performed is determined with reference to a backup-performed flag to be described later that is set at 225.

If a negative determination is made at 205, then the routine proceeds to processing at 210. At 210, it is determined whether the difference between respective absolute values of the deceleration indicated by the output signal of the first filter 70b and the estimated body deceleration indicated by the output signal of the second filter 70c (i.e., the absolute value of the deceleration indicated by the detection signal from the G sensor 75 and the absolute value of the estimated body deceleration calculated by the speed calculation unit 70a) are equal to or greater than a predetermined value K. The predetermined value K used here is a threshold set to a value at which the execution of a certain degree of backup control is necessary.

If a positive determination is made at 210, then the routine proceeds to processing at 215 where it is determined whether a backup control end condition is met. In this case, backing up so as to increase the W/C pressure of the rear wheels RL, RR is set as the end condition. The first time the routine arrives at 215, a flag indicating the backup control end condition (a backup-completed flag to be described later) is reset, and therefore a negative determination is made.

If a negative determination is made at 215, then the routine proceeds to processing at 220 where backup control output processing is performed. In the backup control output processing, processing for increasing the backup W/C pressure to the rear wheels RL, RR once a predetermined time (e.g., 300 ms) has elapsed since the routine first arrived at 220 is performed. Therefore, when the routine arrives at 220 for the first time, only a timer count is started, after which the routine proceeds to 230.

As long as the offset of the G sensor 75 at this time is steady and not occurring as noise, the routine will repeatedly arrive at 220 at the next and subsequent calculation cycles. In such cases, however, only the count value of the timer count is checked until the backup timing is reached (until the predetermined time is reached).

Once the backup timing is reached, next at 220 the pressure increasing control valves 37, 38 are controlled to open in order to increase the W/C pressure to the rear wheels RL, RR in one or multiple (e.g., two) pulses. Thus, it is possible to compensate for an insufficient W/C pressure to the rear wheels RL, RR that is caused by the offset included in the detection signal from the G sensor 75.

Accordingly, once the backup control ends at 220, the backup-completed flag is set. This subsequently meets the backup control end condition, and a positive determination is thus made at 215 thereafter. The routine proceeds to processing at 225, where a backup-performed flag is set that indicates backup has been performed.

Next at 230, it is determined whether braking is being performed. Whether braking is being performed may be determined, for example, by a method similar to that at 100 in FIG. 3. If braking is being performed, then it is necessary to continue performing the backup control determination for braking force distribution. However, if braking has been cancelled, the backup control determination must be stopped, in addition to setting up a condition in which the backup control can be performed again at the next braking.

For this reason, if a positive determination is made at 230, then the processing is ended without resetting the backup-performed flag; if a negative determination is made, then the processing is ended after resetting the backup-performed flag. At the same time, the backup-completed flag is also reset.

Figure 8:
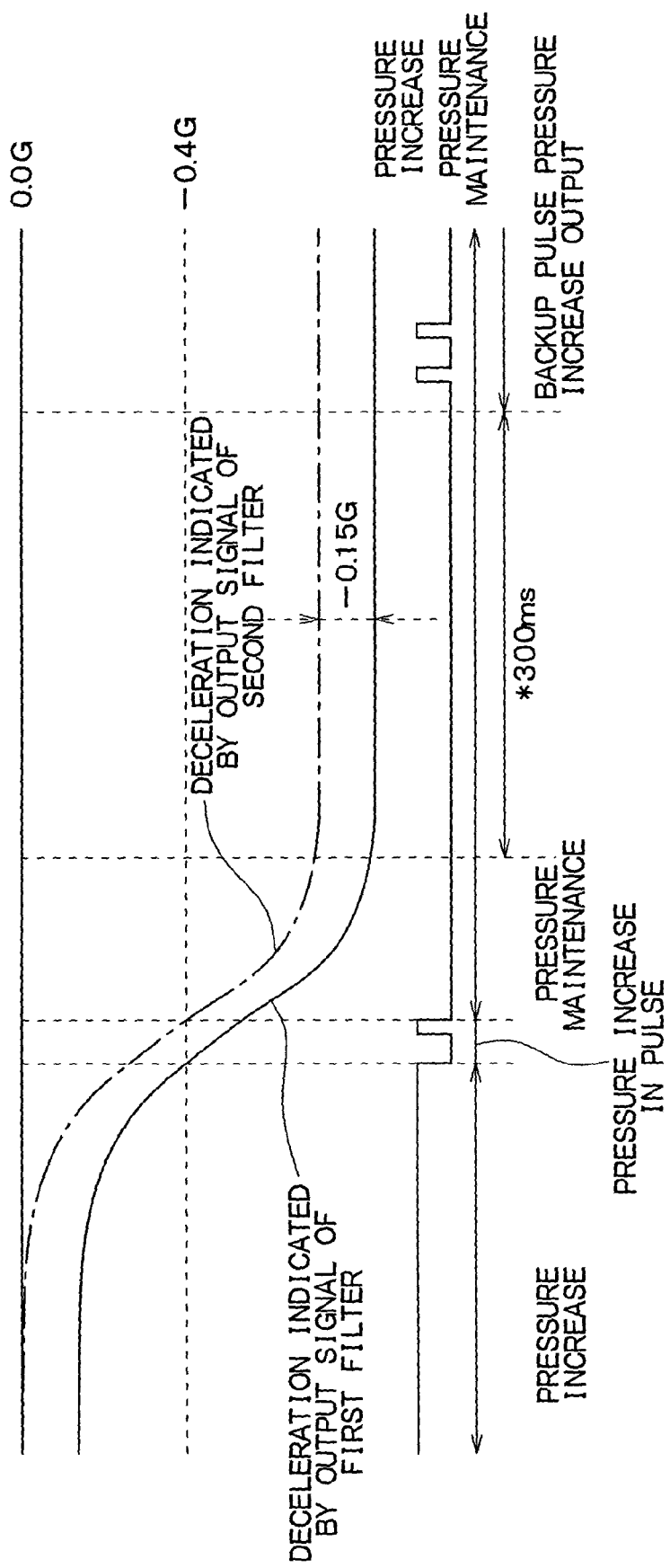
FIG. 8 is a timing chart of a deceleration indicated by the output signal of the first filter, the estimated body deceleration indicated by the output signal of the second filter, and the control conditions of the pressure increasing control valves during slow braking.

The processing for the backup control determination for braking force distribution is thus performed in this manner. FIG. 8 shows a timing chart of the deceleration indicated by the output signal of the first filter 70b and the estimated body deceleration indicated by the output signal of the second filter 70c, as well as the control conditions of the pressure increasing control valves 37, 38 during slow braking. The timing chart shows cases where the processing for the backup control determination for braking force distribution is performed. Namely, even if the offset included in the detection signal from the G sensor 75 causes a difference during slow braking between the deceleration indicated by the output signal of the first filter 70b and the estimated body deceleration indicated by the output signal of the second filter 70c, the W/C pressure to the rear wheels RL, RR is increased as a backup measure.

According to the present embodiment, it is possible to compensate an insufficient W/C pressure to the rear wheels RL, RR caused by the offset included in the detection signal from the G sensor 75, and therefore resolve the problem of an insufficient braking force.

Other Embodiments

In the above embodiment, there are two different differential pressure values for the first differential pressure control valve 16 and the second differential pressure control valve 36. However, suitably changing the open and closed states of the pressure increasing control valves 17, 18 corresponding to the front wheels FL, FR and the pressure increasing control valves 37, 38 corresponding to the rear wheels RL, RR can also achieve a suitable braking force distribution for the front wheels FL, FR and the rear wheels RL, RR. It naturally possible as well to use both this method and a method that differentiates the differential pressure values for the first differential pressure control valve 16 and the second differential pressure control valve 36 in combination.

By using the above-mentioned method, a suitable braking force distribution can be achieved even if the above brake conduit configuration is used as a diagonally-split brake system.

According to the above embodiment, the deceleration calculated by the estimated body speed and the deceleration indicated by the detection signal from the G sensor are respectively pass through separate filters. A quick depression determination is then performed by differing the response speeds of such decelerations. Pressure is subsequently increased in pulses depending on the difference in the response speeds. However, this is but one example of how the quick depression determination may be performed.

The quick depression determination is not particularly limited to relying on the deceleration calculated by the estimated body speed or the detection signal from the G sensor. For example, the quick depression determination may also be performed by using a parameter whose physical amount changes in response to the speed at which the driver depresses the brake pedal, such as the M/C pressure or a stroke of the brake pedal. In this case, a control that increases the braking force may be performed over a time period from the point at which a physical amount indicated by a signal with a fast response speed reaches a first threshold, up to the point at which a physical amount indicated by a signal with a slow response speed reaches a second threshold.

Figure 9:
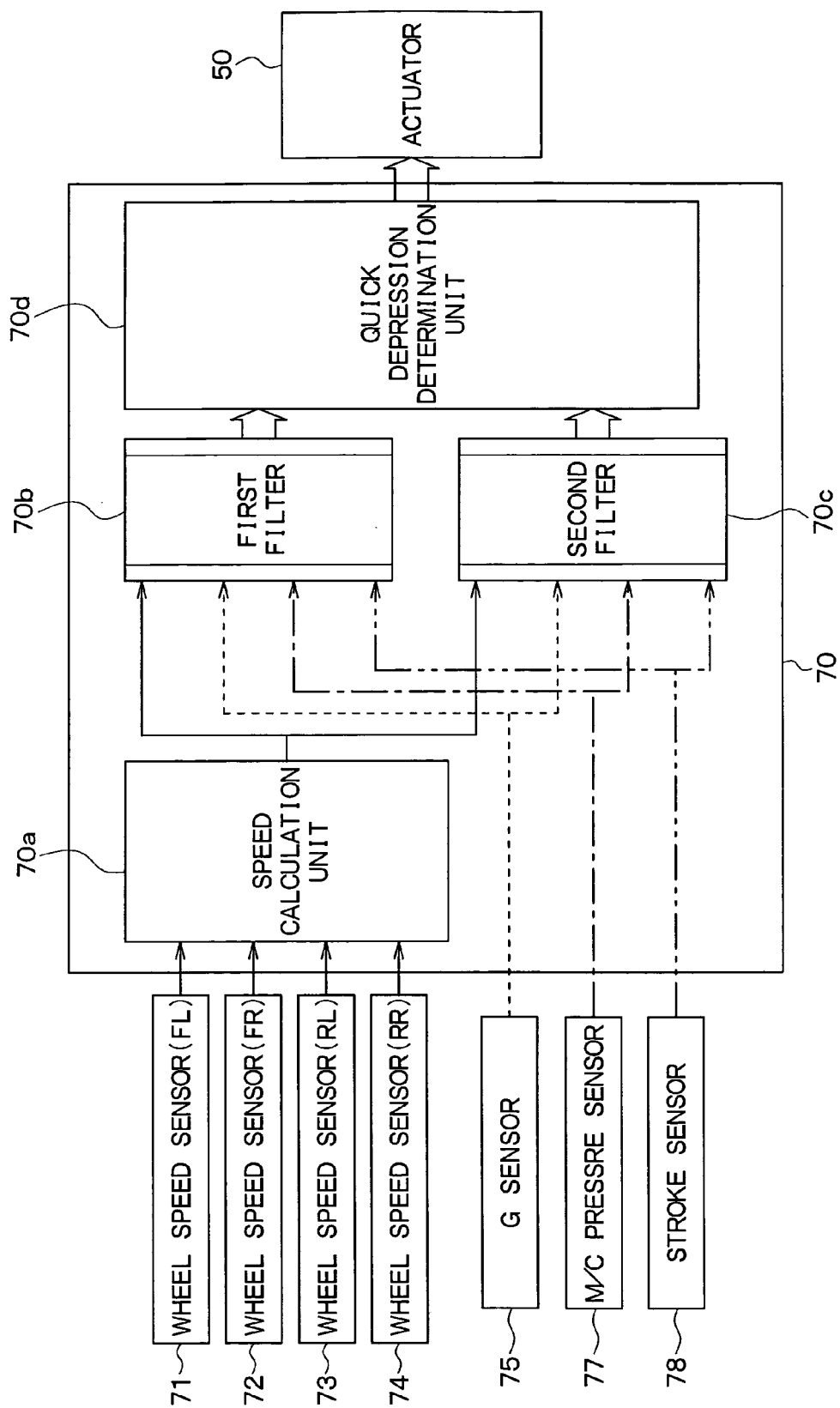
FIG. 9 is a schematic diagram showing an image of various signals that can be used for a quick depression determination.

FIG. 9 is a schematic diagram showing an image of various signals that can be used for a quick depression determination.

Various combinations of such signals as shown in FIG. 9 may be employed as the two signals used for the quick depression determination.

For example, an arbitrary combination of the following may be respectively passed through the different filters 70b, 70c: the deceleration calculated from the estimated body speed by the speed calculation unit 70a; the detection signal from the G sensor 75; a detection signal from an M/C sensor 77, which outputs a detection signal in accordance with the M/C pressure; and a detection signal from a stroke sensor 78, which outputs a detection signal in accordance with a depression amount (stroke) of the brake pedal 11. Passing through the two filters results in different response speeds, and the quick depression determination can thus be performed based on the different response speeds.

In addition, the quick depression determination is not particularly limited to the use of different types of signals. Identical signals, such as the deceleration calculated from the estimated body speed, may be passed through the filters 70b, 70c, which have different filter constants. Passing through the two filters results in different response speeds, and the quick depression determination can also thus be performed based on the different response speeds.

The method here describes achieving different response speeds due to the filter constants of the first and second filters 70b, 70c. However, there is no need to use the first and second filters 70b, 70c in cases where the signals themselves generate a difference in the response speeds. For example, when using the detection signal from the G sensor 75 and the estimated body deceleration calculated by the speed calculation unit 70a, the response speed of the estimated body deceleration naturally differs from that of the detection signal from the G sensor 75 in an amount corresponding to the calculation time required to calculate the estimated body deceleration. In such case, use of the first and second filters 70b, 70c is not necessary. However, passing the corresponding signals through the first and second filters 70b, 70c, or passing the corresponding signals through the same filter can provide effects such as a more conspicuous difference in the response speeds and is thus preferable.

Note that in addition to the deceleration calculated from the estimated body speed and the detection signal from the G sensor 75, FIG. 9 also shows cases where the detection signals from the M/C sensor 77 and the stroke sensor 78 are used. However, the use of other signals is also conceivable, provided that these are signals whose physical amounts change in response to the speed at which the driver depresses the brake pedal.

Further note that the steps shown in each figure correspond to portions for performing various processing. For example, the processing at 120 in FIG. 3 corresponds to a second portion; the processing at 130 in FIG. 3 corresponds to a third portion; and the processing at 210 in FIG. 7 corresponds to a fourth portion.

While the above description is of the preferred embodiments of the present invention, it should be appreciated that the invention may be modified, altered, or varied without deviating from the scope and fair meaning of the following claims.

What is claimed is:
1. A braking force distribution control device,
setting a brake force of a rear wheel at an upper limit based on a first signal indicating a parameter, the first signal changing depending on an operation of a brake operation member during braking, when the first signal reaches a predetermined first threshold, and outputting a control signal to a brake hydraulic pressure control actuator to maintain the braking force of the rear wheel based on the upper limit, and to distribute braking forces to a front wheel and the rear wheel, comprising:

a signal formation portion that forms a second signal, the second signal changing depending on the operation of the brake operation member during braking and changing slower than the first signal;

a first signal detection portion that detects a first timing at which the first signal reaches the first threshold during braking;

a second signal detection portion that detects a second timing at which the second signal reaches a predetermined second threshold during braking; and a braking force increasing portion that enables an output of the control signal to the actuator to increase the braking force of the rear wheel to a force greater than the upper limit over a time period from when the first signal detection portion detects the first timing when the first signal reaches the first threshold during braking to when the second signal detection portion detects the second timing when the second signal reaches the second threshold during a same braking.

2. The braking force distribution control device according to claim 1, wherein
the signal forming portion forms the first and second signals by passing an identical signal through first and second filters having two different characteristics, the first signal being formed by passing the identical signal through one of the first and second filters and the second signal being formed by passing the identical signal through the other one of the first and second filters.

3. The braking force distribution control device according to claim 2, wherein
the identical signal is any one of a signal indicating an estimated body deceleration, a detection signal from an acceleration sensor, a detection signal from a master cylinder pressure sensor, and a detection signal from a stroke sensor for the brake operation member.

4. The braking force distribution control device according to claim 1, wherein
the signal forming portion forms the first and second signals by passing two separate signals through a filter or passing two separate signals through first and second filters having two different characteristics.

5. The braking force distribution control device according to claim 4, wherein
the two separate signals are a combination of any two signals indicating an estimated body deceleration, a detection signal from the acceleration sensor, a detection signal from the master cylinder pressure sensor, and a detection signal from the stroke sensor for the brake operation member.

6. The braking force distribution control device according to claim 1, wherein
the braking force increase portion increases the braking force to the rear wheel in accordance with a length of the time period.

7. The braking force distribution control device according to claim 1, wherein
the first signal is a signal indicating an estimated body deceleration and the second signal is a detection signal from the acceleration sensor,
the braking force distribution control device further comprises an offset determination portion that determines whether there is a steady difference between the estimated body deceleration indicated by the first signal and the deceleration signal indicated by the second signal, and
the braking force increase portion executes a backup control for increasing the braking force to the rear wheel if the offset determination portion determines there is the steady difference during the braking force distribution control.

8. The braking force distribution control device according to claim 2, wherein
the first and second filters are filters extracting and outputting a desired frequency band from the input signal.

9. The braking force distribution control device according to claim 3, wherein
the first and second filters are filters extracting and outputting a desired frequency band from the input signal.

10. The braking force distribution control device according to claim 1, wherein
the first and second signal each indicate the same physical variable; and
the first and second threshold are the same value.

11. The braking force distribution control device according to claim 2, wherein
the first and second signal each indicate the same physical variable; and
the first and second threshold are the same value.

12. The braking force distribution control device according to claim 3, wherein
the first and second signal each indicate the same physical variable; and
the first and second threshold are the same value.

13. The braking force distribution control device according to claim 4, wherein
the first and second signal each indicate the same physical variable; and
the first and second threshold are the same value.

14. The braking force distribution control device according to claim 5, wherein
the first and second signal each indicate the same physical variable; and
the first and second threshold are the same value.

15. The braking force distribution control device according to claim 6, wherein
the first and second signal each indicate the same physical variable; and
the first and second threshold are the same value.

16. The braking force distribution control device according to claim 7, wherein
the first and second signal each indicate the same physical variable; and
the first and second threshold are the same value.

17. The braking force distribution control device according to claim 8, wherein
the first and second signal each indicate the same physical variable; and
the first and second threshold are the same value.

18. A brake electronic control unit comprising:
a speed calculation unit that accepts detection signals from wheel speed sensors attached to wheels of the vehicle and a detection signal from an acceleration sensor in the vehicle;
a first filter that accepts a signal indicating a deceleration from the speed calculation unit;
a second filter that accepts a detection signal from the acceleration sensor;
a quick depression determination unit that accepts signals from the first filter and the second filter, wherein the first filter and the second filter have different filter constants such that the first filter generates output signals at a faster response speed than the output signals generated by the second filter, the quick depression determination unit sets a brake force of a rear wheel as an upper limit when a signal from the first filter indicates a braking operation has resulted in a braking parameter reaching a threshold, the quick depression determination unit further controlling an actuator to maintain the braking force of the rear wheel based on the upper limit, the quick depression determination unit further controls the actuator to increase the braking force of the rear wheel to higher than the upper limit from a first time when the quick depression determination unit sets the upper limit to a second time when a signal from the second filter indicates a braking operation has resulted in the braking parameter reaching the threshold.

19. A braking electronic control unit that sets a brake force of a rear wheel as an upper limit when a first signal, that changes depending on an operation of a brake operation member during braking, reaches a predetermined threshold, the breaking electronic control unit further outputting a control signal to an actuator so that the actuator maintains the braking force of the rear wheel based on the upper limit and distributes braking forces to a front wheel and the rear wheel, the braking electronic control unit comprising:

- a signal formation portion that forms a second signal that changes depending on the operation of the brake operation member during braking, the formation of the second signal occurring more slowly than the formation of the first signal;
- a first signal detection portion that detects the first signal reaching the predetermined threshold during braking;
- a second signal detection portion that detects the second signal reaching the predetermined threshold during braking; and
- a braking force increasing portion that outputs a control signal to the actuator to increase the braking force of the rear wheel to a braking force greater than the upper limit, for a period of time from when the first signal detection portion detects the first signal reaching the predetermined threshold until when the second signal detection portion detects the second signal reaching the predetermined threshold during braking.

* * * * *